(12) United States Patent
Liang et al.

(10) Patent No.: US 11,983,821 B2
(45) Date of Patent: May 14, 2024

(54) CONTROL METHOD AND APPARATUS FOR MOVABLE PLATFORM, AND CONTROL SYSTEM THEREOF

(71) Applicant: SZ DJI TECHNOLOGY CO., LTD., Shenzhen (CN)

(72) Inventors: Jiabin Liang, Shenzhen (CN); Yi Tian, Shenzhen (CN); Yingying Li, Shenzhen (CN); Yamei Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 108 days.

(21) Appl. No.: 17/700,553

(22) Filed: Mar. 22, 2022

(65) Prior Publication Data

US 2022/0215632 A1 Jul. 7, 2022

Related U.S. Application Data

(63) Continuation of application No. PCT/CN2020/112085, filed on Aug. 28, 2020.

(51) Int. Cl.
*G06T 19/00* (2011.01)
*G06T 7/60* (2017.01)
(Continued)

(52) U.S. Cl.
CPC .............. *G06T 19/003* (2013.01); *G06T 7/60* (2013.01); *G06T 7/70* (2017.01); *G06V 10/469* (2022.01); *G06V 10/761* (2022.01)

(58) Field of Classification Search
CPC ........... G06T 19/003; G06T 7/60; G06T 7/70; G06T 15/20; G06T 19/20;
(Continued)

(56) References Cited

U.S. PATENT DOCUMENTS 9,678,506 B2 * 6/2017 Bachrach ............. G05D 1/0016
11,551,410 B2 * 1/2023 Bell ........................ G06T 17/00
(Continued)

FOREIGN PATENT DOCUMENTS

CN 1843712 A 10/2006
CN 105867433 A 8/2016
(Continued)

OTHER PUBLICATIONS

International Search Report and Written Opinion dated May 27, 2021, received for PCT Application PCT/CN2020/112085, Filed on Aug. 28, 2020, 9 pages including English Translation.

*Primary Examiner* — Vijay Shankar
(74) *Attorney, Agent, or Firm* — XSENSUS LLP

(57) ABSTRACT

The present disclosure relates to a method for controlling a movable platform. The method may include obtaining a target object selection operation input by a user on an interaction interface, the interaction interface displaying a three-dimensional model of an operation area, the target object selection operation configured to determine a position of a target object in the operation area; determining a target orientation of the movable platform when the target object is operated based on an orientation of the three-dimensional model displayed on the interaction interface when the target object selection operation is obtained; and determining a target position of the movable platform when the movable platform performs operation on the target object based on the position of the target object, the target orientation, and an operation distance of the movable platform.

20 Claims, 6 Drawing Sheets

(51) Int. Cl.
*G06T 7/70* (2017.01)
*G06V 10/46* (2022.01)
*G06V 10/74* (2022.01)

(58) Field of Classification Search
CPC . G06T 2207/10032; G06T 2207/30252; G06T 2219/2016; G06T 7/73; G06V 10/469; G06V 10/761; G06V 20/17; Y02P 90/02; G05D 1/00; G05D 1/10; G05D 1/0044; G06F 3/048; G06F 3/0484; G06F 3/04847; G06F 3/04845
See application file for complete search history.

(56) References Cited

U.S. PATENT DOCUMENTS

| | | | |
|---|---|---|---|
| 11,573,562 B2* | 2/2023 | Bachrach | B64C 39/024 |
| 11,666,825 B2* | 6/2023 | Delamont | G06T 19/006 |
| | | | 463/32 |
| 2015/0370250 A1* | 12/2015 | Bachrach | G05D 1/0044 |
| | | | 701/2 |
| 2020/0257307 A1 | 8/2020 | Tian et al. | |

FOREIGN PATENT DOCUMENTS

| | | |
|---|---|---|
| CN | 107179768 A | 9/2017 |
| CN | 107220099 A | 9/2017 |
| CN | 107583271 A | 1/2018 |
| CN | 111508066 A | 8/2020 |
| JP | 2010-94777 A | 4/2010 |

\* cited by examiner

CONTROL METHOD AND APPARATUS FOR MOVABLE PLATFORM, AND CONTROL SYSTEM THEREOF

CROSS-REFERENCE TO RELATED APPLICATION

The present application is a continuation of International Application No. PCT/CN2020/112085, filed Aug. 28, 2020, the entire contents of which is incorporated herein by reference in its entirety.

TECHNICAL FIELD

The present disclosure relates to the technical field of human-computer interaction, and in particular, to control methods and apparatus of a movable platform, and a control system thereof.

BACKGROUND

There is a need in many fields to perform fine control on a movable platform such as an unmanned aerial vehicle, an unmanned vehicle, an intelligent robot, and the like, to perform a specific job task. For example, when an unmanned aerial vehicle is used for inspection, the unmanned aerial vehicle usually needs to be controlled to photograph an operation object such as a power insulator, a dam and the like at a specific angle. For another example, a mechanical arm is generally used for fruit picking and other scenes, and the mechanical arm needs to be controlled to move to a specific position at a specific angle, so that picking of the fruit can be completed.

SUMMARY

Sone embodiments of the present disclosure provide a movable platform control method and apparatus, a movable platform, and a control system thereof.

In a first aspect of the present disclosure, a method for controlling a movable platform includes: obtaining a target object selection operation input by a user on an interaction interface, the interaction interface displaying a three-dimensional model of an operation area, the target object selection operation configured to determine a position of a target object in the operation area; determining a target orientation of the movable platform when the target object is operated based on an orientation of the three-dimensional model displayed on the interaction interface when the target object selection operation is obtained; and determining a target position of the movable platform when the movable platform performs operation on the target object based on the position of the target object, the target orientation, and an operation distance of the movable platform so as to enable the movable platform to move to the target position and perform operation on the target object according to the target orientation.

In a second aspect of the present disclosure, a control apparatus for a movable platform includes a processor, a memory, and a computer program stored in the memory and executable by the processor. The processor executes the computer program to implement the following steps: obtaining a target object selection operation input by a user on an interaction interface, the interaction interface displaying a three-dimensional model of an operation area, the target object selection operation configured to determine a position of a target object in the operation area; determining a target orientation of the movable platform when the target object is operated based on an orientation of the three-dimensional model displayed on the interaction interface when the target object selection operation is obtained; and determining a target position of the movable platform when the movable platform performs operation on the target object based on the position of the target object, the target orientation, and an operation distance of the movable platform so as to enable the movable platform to move to the target position and perform operation on the target object according to the target orientation.

In a third aspect of the present disclosure, a control system includes a movable platform and a control terminal. The control terminal is configured to obtain a target object selection operation input by a user on an interaction interface, the interaction interface displaying a three-dimensional model of an operation area, the target object selection operation being used for determining a position of a target object in the operation area; determine a target orientation when the target object is operated according to the orientation of the three-dimensional model displayed by the interaction interface when the target object selection operation is obtained; determine a target position of the movable platform when the movable platform performs operation on the target object according to the position of the target object, the target orientation, and the operation distance of the movable platform; and generate the control instruction based on the target orientation and the target position and send the control instruction to the movable platform. The movable platform is configured to move to a target position based on the control instruction and perform operation on the target object according to the target orientation.

By applying the solutions provided according to some embodiments of the present disclosure, the user can adjust the three-dimensional model to the orientation of the target object suitable for observing the target object according to the visual effect of the three-dimensional model of the operation area displayed by the interaction interface, and determine the target orientation by browsing and adjusting the three-dimensional model of the interaction interface. The user can determine the target position when performing the operation on the target object by browsing and adjusting the three-dimensional model of the interaction interface, and can accurately control the operation distance according to the determined position of the target object, the target orientation and the operation distance, which is very convenient to operate.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

DETAILED DESCRIPTION

Figure 1:
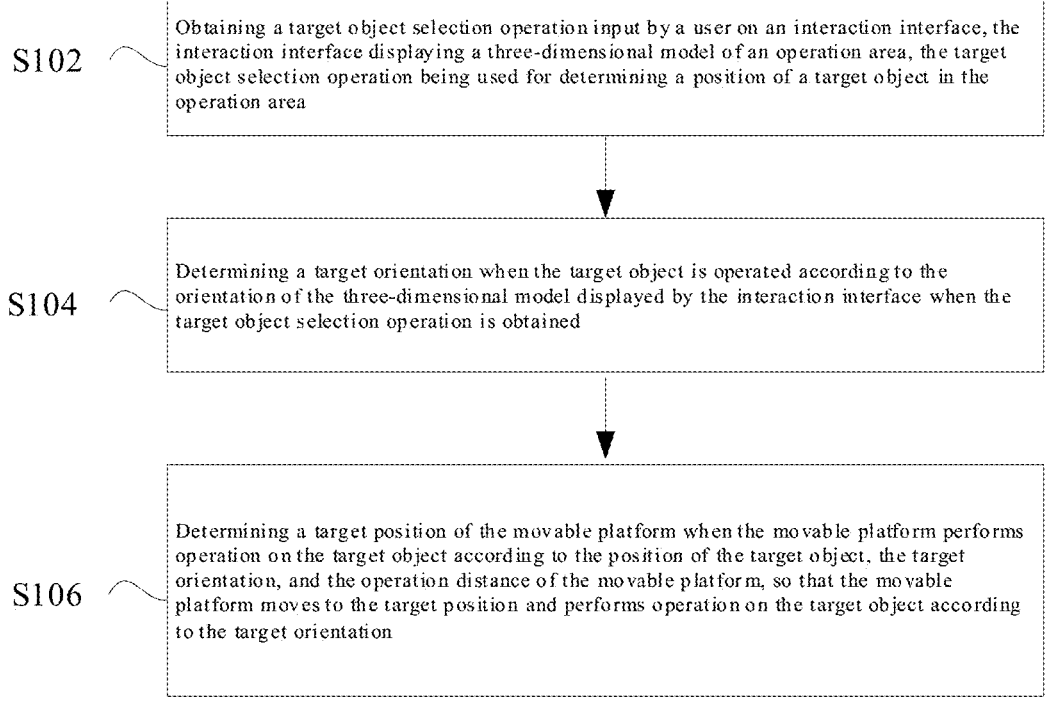
FIG. 1 is a flowchart of a method for controlling a movable platform according to an embodiment of this disclosure.

The technical solutions in the embodiments of this disclosure will be clearly and completely described below with reference to the accompanying drawings in the embodiments of this disclosure, and obviously, the described embodiments are merely some embodiments of the present disclosure, rather than all of the embodiments. All other embodiments obtained by a person of ordinary skill in the art based on the embodiments of the present disclosure without creative efforts shall fall within the protection scope of the present disclosure.

A movable platform such as an unmanned aerial vehicle, an unmanned vehicle, an intelligent robot and the like is widely applied in many fields, such as using the unmanned aerial vehicle for inspection, using the mechanical arm for fruit picking, or using the unmanned aerial vehicle or the unmanned vehicle to perform drug spraying, irrigation and the like. When executing these job tasks, the movable platform usually needs to be finely controlled, for example, the movable platform is controlled to move to a specific position and angle, and then the target object is operated, so that a better operation effect can be achieved. In the related art, when manually controlling the movable platform to perform the operation, for example, the position and orientation of the movable platform are manually adjusted according to the user's observation or the photo returned by the movable platform. As such, the manual control is required for each operation and the manpower is consumed. In another related art, the position and orientation of the operation of the movable platform can be determined by the user on the interaction interface of the three-dimensional model displayed with the operation area, and then the position of the operation is determined according to the stored position and orientation. For example, the user clicks on a ground point, then dragging a certain distance in the height direction, and then the user needs to input the attitude angle of the movable platform in the height direction, and continuously adjust the angle of the input according to the preview displayed by the preview window in the interaction interface, so as to determine the orientation of the movable platform in the final operation. In this way, the operation distance of the movable platform cannot be accurately controlled, and the user needs to repeatedly adjust the angle of the input, which is particularly tedious.

One embodiment of the present disclosure provides a control method of a movable platform. A user can adjust orientation of a three-dimensional model on an interaction interface that shows the three-dimensional model of an operation area, determine a position of a target object according to a target object selection operation input by the user on the interaction interface, determine a target orientation of the movable platform according to the orientation of the three-dimensional model when the user inputs the target object selection operation, and determine a target position of the movable platform during operation of the target object according to the position of the target object, the target orientation and the operation distance of the movable platform. The user can visually determine the orientation suitable for the operation of the movable platform based on the three-dimensional model of the interaction interface without requiring the user to adjust the orientation through multiple input angles, which is convenient and fast, and can accurately control the operation distance of the movable platform by adjusting the position of the operation by taking the target object as the center.

In one embodiment, as shown in FIG. 1, the method includes the following steps:

S102: obtaining a target object selection operation input by a user on an interaction interface, the interaction interface displaying a three-dimensional model of an operation area, the target object selection operation being used for determining a position of a target object in the operation area.

S104: determining a target orientation of a movable platform when the target object is operated according to the orientation of the three-dimensional model displayed by the interaction interface when the target object selection operation is obtained.

S106: determining a target position of the movable platform when the movable platform performs operation on the target object according to the position of the target object, the target orientation, and the operation distance of the movable platform, so that the movable platform can move to the target position and perform operation on the target object according to the target orientation.

The movable platform control method according to one embodiment of the present disclosure may be executed by the movable platform. For example, in some embodiments, the movable platform may provide a human-computer interaction interface, and the user may operate on the human-computer interaction interface, determine a target position and a target orientation of the movable platform when performing operation on the target object, and then operate the movable platform according to the determined target position and the target orientation. In some embodiments, the movable platform control method of the present disclosure may also be executed by a control terminal, and the control terminal may be a terminal device such as a notebook computer, a remote controller, a mobile phone, a tablet, and the like. The control terminal may provide a human-computer interaction interface for obtaining an interaction operation of the user and control the movable platform according to the interaction operation of the user.

The movable platform according to one embodiment of the present disclosure is a movable platform currently used for performing operation on the target object, and the movable platform may comprise a power component for driving the movable platform to move, and the movable platform may be an unmanned aerial vehicle, an unmanned vehicle, an intelligent robot, or the like.

The target object of the present disclosure refers to an object to be operated by the movable platform. The target object may be a power device, a dam, a bridge or the like that needs to be inspected. The target object may be a crop that needs to be sprayed or irrigated, or a fruit that needs to be picked or the like. The target object may be one or more, and an operation area refers to an area including the one or more target objects. The three-dimensional model of the operation area may be a three-dimensional model obtained by photogrammetry three-dimensional reconstruction, or a three-dimensional model obtained through laser radar scanning or a CAD model in a design process.

The device executing the control method can load the three-dimensional model of the operation area in the three-dimensional engine and display the three-dimensional model to the user through the human-computer interaction interface. When the user start to determine the target orientation and the target position of the movable platform for operating on the target object, the three-dimensional model can be moved and rotated on the interaction interface, and the orientation of the three-dimensional model can be adjusted to a suitable orientation or direction for observing the orientation of the target object, such as adjusting to the orientation of the target object at which the target object is not blocked by other objects and clearly observable. After the user adjusts the orientation of the three-dimensional model on the interaction interface, the target object selection operation may be input through the interaction interface. The device executing the control method may obtain a target object selection operation input by the user, determine the position of the target object according to the target object selection operation, and then determine a target orientation of the movable platform when the target object is operated according to the orientation of the three-dimensional model displayed on the interaction interface when the target object selection operation is obtained. The target orientation is consistent with the orientation of the three-dimensional model observed by the user from the interaction interface, and the user observes the perspective of the three-dimensional model on the interaction interface, that is, the viewing angle of the target object is observed for the movable platform to perform operation on the target object. After the target orientation is determined, the target position of the movable platform during operation of the target object can be determined according to the determined position of the target object, the target orientation, and the operation distance of the movable platform, so as to enable the movable platform to move to the target position and to operate the target object according to the target orientation.

It should be noted that the target position and the target orientation in the present disclosure may be both the position and the orientation of the movable platform when the target object is operated, or may be the position and orientation of a component on the movable platform which operates on the target object. For example, assuming that the unmanned aerial vehicle performs inspection on an electronic device, and since position difference between a center of the unmanned aerial vehicle and a center of a photographing device is small, the center of the unmanned aerial vehicle can be directly adjusted to the target position. Of course, in order to more accurately control the unmanned aerial vehicle, the target position can be adjusted according to the positional relationship between the center of the photographing device and the center of the unmanned aerial vehicle to obtain the adjusted position, so that the photographing device of the unmanned aerial vehicle is located at the target position for operation. The target orientation may be the orientation of the movable platform, or. the orientation of the component on the movable platform which operates, such as the orientation of the photographing device on the unmanned aerial vehicle or the orientation of the robotic arm on the unmanned vehicle.

By using the method provided in some embodiments of the present disclosure, the user can adjust the orientation of the three-dimensional model according to the visual effect of the target object displayed by the interaction interface, so as to determine the orientation of the target object suitable for observing the target object. In this way, the user can intuitively determine the appropriate orientation when operating on the target object, without having to adjust the orientation during the operation multiple times by continuously inputting the angle. The target position during operation of the target object can be determined by determining the position of the target object, the target orientation and the operation distance, and the operation distance can be accurately controlled according to the user requirement.

The target object selection operation input by the user may be any operation used for determining the position of the target object according to the three-dimensional model, for example, a click operation of the target object in the three-dimensional model displayed by the user or a selection operation of a target object in the three-dimensional model by a frame selection. The position of the target object can be determined according to the target object selection operation input by the user. For example, the user may click a center region of the target object at the interaction interface, and then use the center position that the user clicked as the position of the target object, or the user may click a plurality of points on the target object to determine the target object. For example, when the target object is a person, the user may click a first point at the head, click a second point at the body position, and click a third point at the foot position, and these three points clicked by the user can form a line and take a center of the line as the position of the target object. Since the three-dimensional model is a model carrying the geographical location information, the three-dimensional coordinates of the position of the target object can be determined according to the interaction operation of the user in the three-dimensional model.

Figure 2:
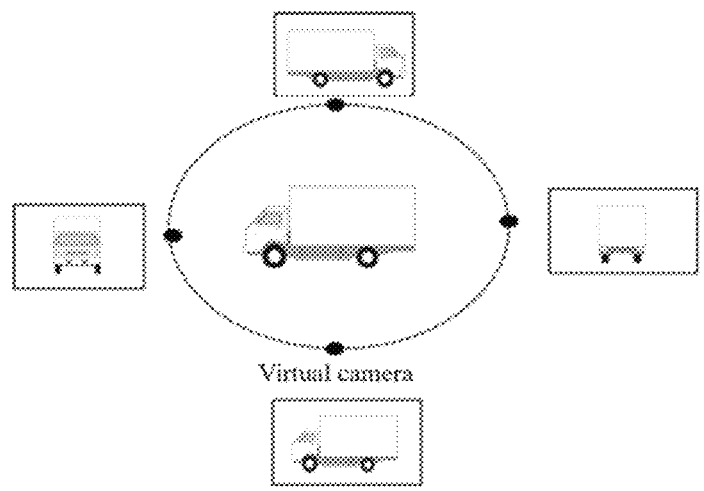
FIG. 2 is a schematic diagram of an image obtained by capturing a three-dimensional object from different orientations according to an embodiment of the present disclosure.

In general, a three-dimensional engine corresponds to a virtual camera, and an image of the operation area presented on the interaction interface is equivalent to the virtual camera shooting the operation area at different viewing angles. For example, when the user continuously moves and rotates the three-dimensional model on the interaction interface, the position and orientation of the virtual camera changes continuously. As shown in FIG. 2, assuming that the three-dimensional model is a model of an automobile, when the user adjusts the orientation of the three-dimensional model, that is, when the image presents different angles of the automobile (an automobile image in the rectangular frame in the figure), it may be considered that the image is an image captured by the virtual camera (black dots in the figure) in different orientations. When the user operates on the three-dimensional model on the interaction interface, the position of the corresponding virtual camera and the orientation of the virtual camera towards the three-dimensional engine may be determined. In some embodiments, the orientation of the three-dimensional model displayed by the interaction interface is in one-to-one correspondence with the orientation of the virtual camera. Therefore, the orientation of the virtual camera corresponding to the orientation of the three-dimensional model displayed by the current interaction interface may be used as the target orientation when the target object is operated.

Figure 3:
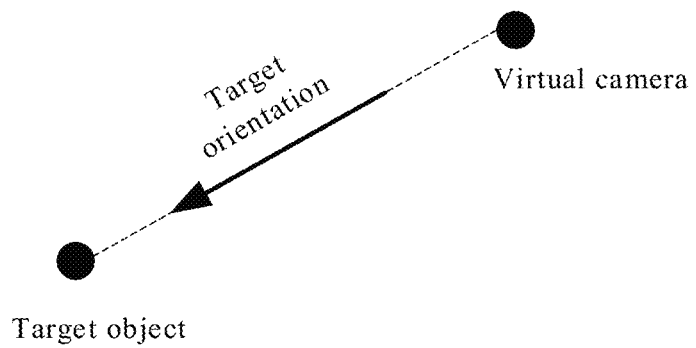
FIG. 3 is a schematic diagram of determining a target orientation according to an embodiment of this disclosure.

In some embodiments, as shown in FIG. 3, the target orientation can be along a line connecting the position of the target object and the position of the virtual camera and point to the position of the target object. For example, when the user stops moving or rotating the three-dimensional model in the interaction interface, the three-dimensional engine may automatically determine the position of the current virtual camera (which may be three-dimensional coordinates corresponding to the virtual camera center), and then connect the center of the virtual camera with the center of the target object to obtain a connection line, and the target orientation of the movable platform when the target object is operated can point to the target object along the connection line.

Figure 4:
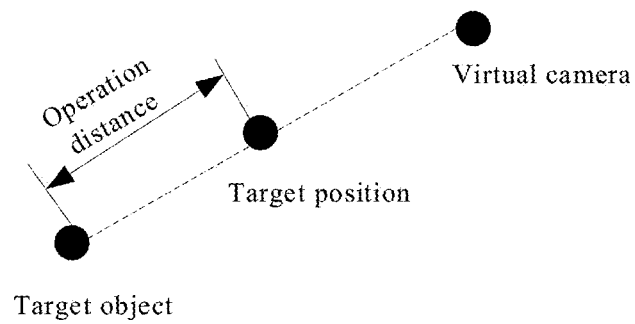
FIG. 4 is a schematic diagram of determining a target position according to an embodiment of this disclosure.

In some embodiments, as shown in FIG. 4, the target position of the movable platform when the target object is operated may be located on the connection line of the position of the target object and the position of the virtual camera, and the distance from the target position to the target object is the operation distance. After determining the position of the virtual camera (which may be three-dimensional coordinates corresponding to the center of the virtual camera) and the position of the target object (which may be three-dimensional coordinates corresponding to the center of the target object), a connection line is obtained from the center of the virtual camera and the center of the target object, and then the target object is taken as the reference to move in an amount of the operation distance along the connection line to reach the target position, so that the distance when the movable platform performs operation on the target object can be determined as the expected operation distance of the user.

After the user performs translation rotation on the interaction interface to determine the orientation of the three-dimensional model displayed on the interaction interface, and inputs the target object selection operation, the device that executes the control method can determine the target position and the target orientation of the movable platform when performing the operation on the target object according to the target object selection operation and the orientation of the three-dimensional model displayed by the interaction interface. Of course, the user may further fine tune the target position and the target orientation to adjust to a better position and orientation. In some embodiments, the device executing the control method may obtain the adjustment operation input through the interaction interface, determine the adjusted target position according to the position of the target object and the adjustment operation input by the user, and adjust the target orientation according to the adjusted target position. The adjusted target orientation points to the position of the target object from the adjusted target position.

The operation distance of the movable platform may be adjusted according to the actual needs of the user, and may be input by the user or be automatically determined by the device executing the control method. For example, for a scenario of drug spraying, the distance between the spray head and the crop is required in order to ensure the effect of drug spraying, and the user can input the operation distance through the interaction interface. For a scenario of obtaining an image of a target object, the operation distance may be determined according to a spatial resolution of the image collected by the user, where the spatial resolution refers to a physical size corresponding to a pixel point in the image. For example, if the user needs to observe the details of a local area of the target object, the movable platform should be close to the target object as close as possible, the operation distance can be set to a small value. If the user needs to observe full appearance of the target object, the operation distance should ensure that the movable platform can capture the entire target object. In some embodiments, the operation distance of the movable platform may be determined according to the size of the target object, determined according to the spatial resolution, or in combination with the size of the target object and the spatial resolution, and the spatial resolution may be input by the user through the interaction interface or preset. For example, the user may input a spatial resolution according to a requirement for spatial resolution of an image of the target object, and then the device executing the control method may automatically calculate the operation distance according to the following formula (1):

$$d = gsd * w/35 * f \quad (1)$$

wherein d is the operation distance, w is a pixel width of the image sensor, f is the equivalent focal length of the lens of 35 mm, gsd is the spatial resolution, representing an actual distance of the object in the three-dimensional space that a size of the pixel point on the image corresponds to.

The operation distance may also be determined according to the size of the target object. For example, in some scenarios, a complete target object needs to be shot in one image, and therefore, the operation distance may be determined according to the size of the target object. The operation distance may be determined according to formula (2):

$$d = L/35 * f \quad (2)$$

wherein L is the size of the target object, and f is the equivalent focal length of the lens of 35 mm.

In some embodiments, the operation distance can also be determined jointly in combination with the spatial resolution and the size of the target object. For example, the user can input the change range of the spatial resolution, and then the operation distance can be determined according to the spatial resolution range input by the user and the size of the target object, so that the space resolution requirement input by the user can be met, and the complete target object can be shot.

In some embodiments, after the operation distance is determined according to the spatial resolution input by the user, if the complete target object cannot be captured at the operation distance, the orientation of the photographing device on the movable platform may be adjusted to capture a plurality of images, and then the plurality of images are synthesized to obtain an image including the complete target object.

In some embodiments, if the photographing device on the movable platform is zoomable, the focal length can be adjusted according to the desired operation distance to meet the requirement of the user for the operation distance.

Figure 5:
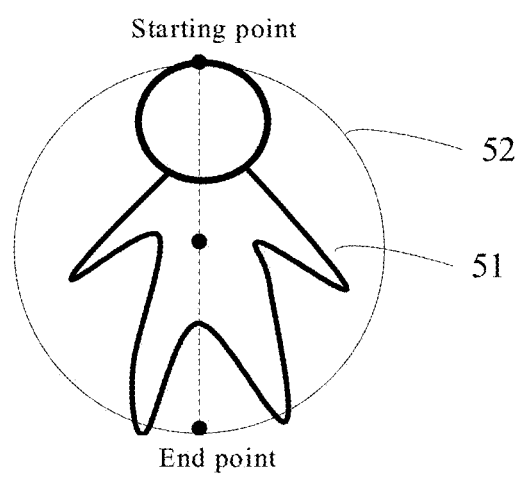
FIG. 5 is a schematic diagram of determining a position of a target object and a target area corresponding to a target object according to an embodiment of this disclosure.
Figure 6:
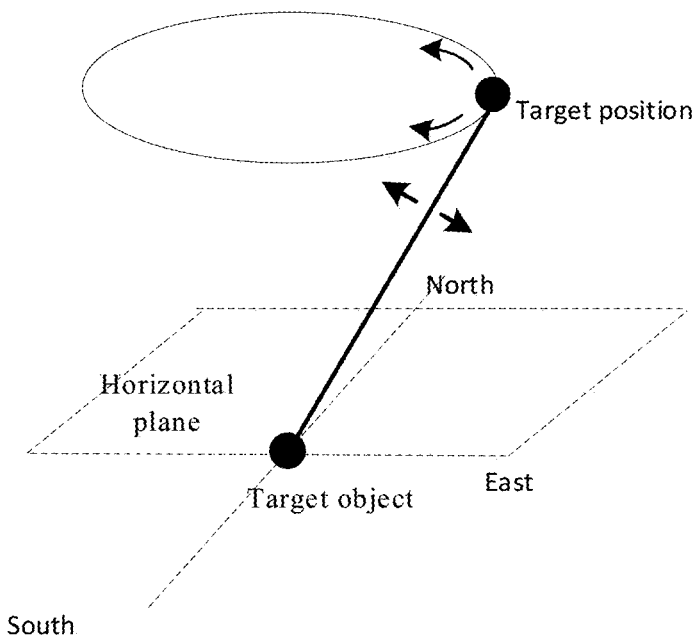
FIG. 6 is a schematic diagram of an adjustment operation according to an embodiment of this disclosure.
Figure 7:
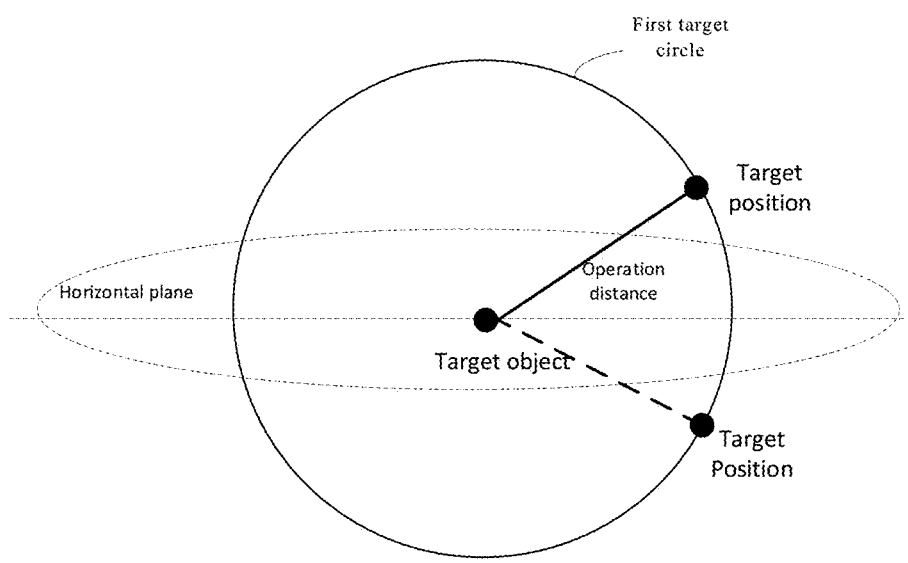
FIG. 7 is a schematic diagram of an adjustment path of a first adjustment operation according to an embodiment of this disclosure.

In some embodiments, when determining the size of the target object, a target area corresponding to the target object may be determined according to the target object selection operation input by the user, and then the size of the target area is used as the size of the target object, wherein the target area is generally a three-dimensional space region including the target object. In one embodiment, as shown in FIG. 5, when the target object selection operation is that the user clicks a point at a starting point of the target object 51 on the interaction interface and the user also clicks a point at an end point of the target object, a connection lines of the two points and three-dimensional coordinates of the two points can be determined according to the three-dimensional model. A center of the connection line may be used as a position of the center of the target object 51, a spherical region 52 is determined by taking the connection line as the diameter as the target area of the target object, and the size of the spherical region is the size of the target object. Of course, the shape of the target area is not limited to the spherical shape and may be a three-dimensional space region of various shapes, such as an area of cuboid region. When determining the target position, the position where the entire spherical area can be photographed can be selected as the target position In one embodiment, as shown in FIG. 6, since the position of the target object has been determined, in order to ensure that the movable platform operates on the target object at an expected operation distance, when the target position is adjusted, the target position can be adjusted on the premise of keeping the operation distance of the movable platform unchanged. It can be defined that an angle between the line connecting the position of the target object and the target position and the horizontal plane is the pitch angle, and an angle between the projection of the line connecting the position of the target object and the target position on the horizontal plane and a north direction is the yaw angle. When the target position is adjusted, the distance between the position of the target object and the target position can be kept unchanged, and the pitch angle or the yaw angle can be adjusted to fine tune the target position. Therefore, in some embodiments, the adjustment operation on the target position comprises a first adjustment operation, and the first adjustment operation may be an operation for adjusting the pitch angle, as shown in FIG. 7. The first adjustment operation can enable the target position to be adjusted on a first target circle, wherein the circle center of the first target circle is located at the position of the target object, the plane where the first target circle is located is perpendicular to the horizontal plane, and the radius of the first target circle is the operation distance of the movable platform.

Figure 8:
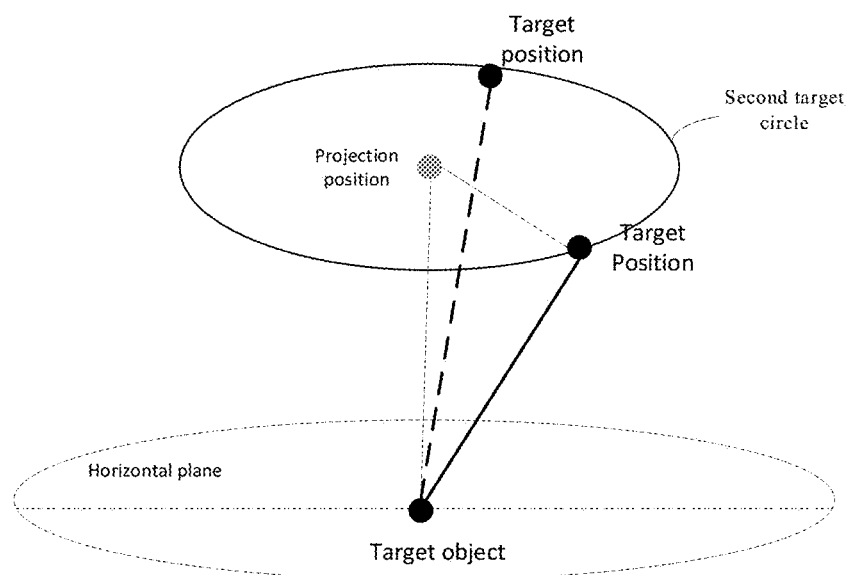
FIG. 8 is a schematic diagram of an adjustment path of a second adjustment operation according to an embodiment of this disclosure.

In some embodiments, the adjusting operation on the target position comprises a second adjustment operation, and the second adjustment operation may be an operation for adjusting the yaw angle, as shown in FIG. 8. The second adjustment operation can enable the target position to be adjusted on the second target circle. A center of the second target circle is located at the projection position of the target object, and the projection position is obtained by projecting the position of the target object onto the horizontal plane passing the target position, and a radius of the second target circle is the distance from the projection position to the target position. In some embodiments, in order for the user to visually see the adjustment path of the target position, the first target circle and/or the second target circle may be displayed on the interaction interface, so that the user can determine an adjustment path of the target position according to the displayed first target circle and the second target circle.

In some embodiments, in order for the user to know whether the adjusted target position and the target orientation are suitable or whether the adjusted target position and the target orientation are appropriate, the interaction interface can further comprise a preview window. In the process of adjusting the target position and the target orientation, the preview window can display the preview effect when the movable platform performs operation according to the target orientation. In this way, when the unmanned aerial vehicle performs image acquisition on the target object, the preview effect of the image can be displayed in the preview window when the unmanned aerial vehicle is located at the adjusted target position and image acquisition is performed on the target object according to the adjusted target orientation. The user can determine whether to continue to adjust the position and orientation of the unmanned aerial vehicle according to the preview effect, and determine the adjustment strategy. In a scene of picking fruits with a robotic arm on a movable platform, a dynamic schematic diagram of the movable platform at the adjusted target position can be displayed in the preview window, and the robotic arm is adjusted to the target direction for picking fruits. At this time, the user can clearly know whether the fruit can be successfully picked if the movable platform is located at the current target position to pick the fruit according to the target orientation, and then determine how to adjust the target position and the target orientation.

Since the target object as the center is adjusted when the target position and the target orientation are adjusted, in some embodiments, the position of the target object in the preview window can be fixed when adjusting the target position and the target orientation. For example, the position of the target object can be kept in the center of the image, and in the adjusting process, the position of the target object is unchanged, so that the user can observe the adjustment effect better.

Figure 9:
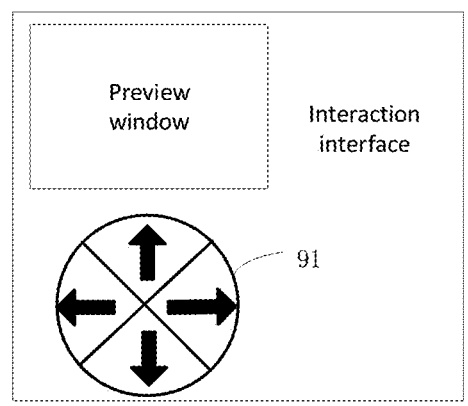
FIG. 9 is a schematic diagram of an interaction interface according to an embodiment of this disclosure.

In some embodiments, an adjustment control may be provided on the interaction interface, and the adjustment operation for adjusting the target position may be triggered by the adjustment control. As shown in FIG. 9, the interaction interface may display an adjustment button 91, and the user may click the adjustment button 91 to adjust the target position and the target orientation.

In some embodiments, in order to ensure the safe operation of the movable platform, after determining the target position of the movable platform for the target object, the distance between the obstacle closest to the target position and the target position can be determined. If the distance is less than the preset safe distance, the target position and the obstacle are identified, so that the user can adjust the target position according to the identifier. For example, the target position and the obstacle may be identified in red color on the interaction interface, or the target position and the obstacle may be selected respectively in a box for the user, so that the user can adjust the target position according to the identifier.

In some embodiments, the number of the target object may be multiple. When there are a first target object and a second target object, and after determining a target position for performing a first target object selected by the user through the first target object selection operation (hereinafter referred to as the target position corresponding to the first target object selection operation), a second target object selection operation input by the user can be obtained, and another target position for performing a second target object selected by the user through the second target object selection operation (hereinafter referred to as the target position corresponding to the second target object selection operation). Then, a connection line between the target position corresponding to the first target object selection operation and the target position corresponding to the second target object selection operation is displayed on the interaction interface. In other words, after the user inputs the target object selection operation on the interaction interface each time, the device executing the control method may automatically determine the target position corresponding to the target object selection operation, and connect with the target position determined at the previous time to form an operation path of the movable platform, and display the operation path. Optionally, the first target object selection operation and the second target object selection operation may also correspond to the same target object, which is not limited in this embodiment of this disclosure.

In the process of moving the movable platform from one target position to another target position, an obstacle may also be present. In order to ensure the security of the operation process of the movable platform, in some embodiments, after determining the connection line between the target position corresponding to the first target selection operation and the target position corresponding to the second target selection operation, the distance between the obstacle closest to the connection line and the connection line may be determined. When the distance is less than the preset safe distance, the connection line and/or the obstacle may be identified, so that the user can adjust the target position corresponding to the first target selection operation and/or the target position corresponding to the second target selection operation.

For the target object in the operation area, there may be a need to repeat the operation on it. For example, after the user performs drug spraying on the crop, it may be necessary to spray the crop many times. Thus, after the user determines the target position and target orientation of each target object through the interactive interface displaying the 3D model and generates the operation path of the movable platform, the operation path of the movable platform can be stored. For example, target parameters used for determining the target position and the target orientation may be stored, so that the target parameters can be called to determine the target position and the target orientation when the target object is operated next time.

In some embodiments, the target parameters may include one or more of a position of the target object, a target orientation, a target position, an operation distance, a size of the target object, and a location of the virtual camera. For example, in some embodiments, the target position and the target orientation may be stored, and when the operation is performed, the movable platform is directly controlled to move to the target position, and the target object is operated according to the target orientation. Of course, the target position, the target orientation, the operation distance and the like of the target object may also be stored, and when the movable platform performs operation on the target object, the target position may be determined directly according to the position, the target orientation and the operation distance of the target object.

Due to the fact that the position of the target object can be stored, the target position and the target orientation can be determined according to the position of the target object. After determining the target position and the target orientation for the target object in the operation area according to the hardware parameters of the movable platform, if another movable platform is used to operate the target object in the same operation area, the user does not need to re-set the operation path through the interactive interface. In some embodiments, the movable platform is a first movable platform, and when the target object is operated by using the second movable platform, the stored target parameters may be obtained. The position and orientation of the second movable platform when performing the operation on the target object is determined according to the stored target parameters and the hardware parameters of the second movable platform. The hardware parameters of the second movable platform may be the same as the hardware parameters of the first movable platform, or may be different. For example, when the user changes to the second movable platform to operate on the target object, the focal length and the pixel width of the sensor of the second movable platform may be different from those of the first movable platform, so the operation distance can be re-determined according to the focal length and the pixel width of the sensor of the second movable platform. Since the position of the target object is known, and the target position and the target orientation can be determined by taking the target object as the center, the operation position and orientation of the second movable platform can be re-determined according to the re-determined operation distance and the position of the target object, so as to update the operation path.

In order to further describe the movable platform control method of the present disclosure, the following is explained in conjunction with a specific embodiment.

Figure 10:
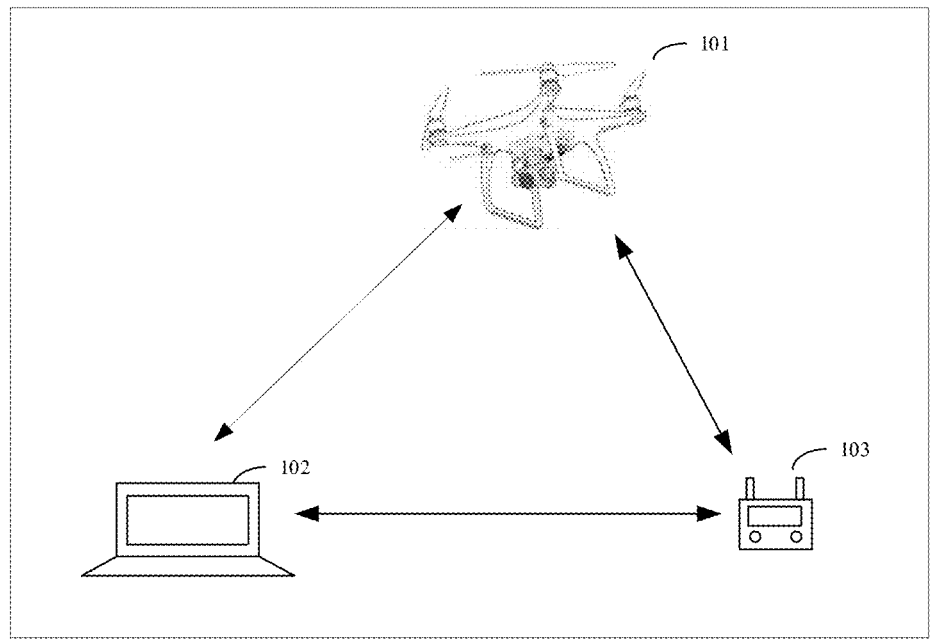
FIG. 10 is a schematic diagram of an application scenario according to an embodiment of this disclosure.

Generally, the unmanned aerial vehicle is used to inspect power equipment, bridges, dams and the like. Images of the target objects to be inspected are collected through the unmanned aerial vehicle, and then whether a fault occurs or not is judged by analyzing the images. As shown in FIG. 10, which is a schematic diagram of an application scenario according to an embodiment of this disclosure. A user may set a target orientation and a target position when an unmanned aerial vehicle 101 performs image acquisition on a target object in an operation area through a software application installed on the control terminal 102, and send the control instruction to the unmanned aerial vehicle 101. Optionally, the control instruction may be sent to the unmanned aerial vehicle 101 through the communication link between the control terminal 102 and the unmanned aerial vehicle 101. The control instruction may be sent to the movable platform through the communication link between the control terminal 102 and the remote controller 103, and the communication link between the remote controller 103 and the unmanned aerial vehicle 101. Optionally, the control terminal 102 may be a notebook computer installed with three-dimensional reconstruction software.

The user can open the software application on the control terminal 102, the three-dimensional engine in the software application can load the three-dimensional model of the operation area, and the three-dimensional model can be obtained through photogrammetry three-dimensional reconstruction, or can be obtained through scanning the operation area through the laser radar. The user may input the spatial resolution through the interaction interface, so as to determine the operation distance of the unmanned aerial vehicle 101 according to the spatial resolution.

The three-dimensional model of the operation area can be displayed to the user through the interaction interface, the user can move or rotate the three-dimensional model to a relatively suitable orientation so as to determine the perspective from which the target object is not blocked and the target object can be observed conveniently. There is a virtual camera in the three-dimensional engine, the picture presented on the interaction interface may be regarded as a picture of the operation area collected by the virtual camera. The orientation of the three-dimensional model corresponds to the orientation of the virtual camera. After the user stops moving the rotating three-dimensional model, the three-dimensional engine may determine the orientation and position of the current three-dimensional model. The user can click the starting position and the ending position of the target object in the three-dimensional model, generate a connection line according to the starting position and the ending position clicked by the user, determine the position of the center of the connection line, and use the position of the center as the position of the target object. After determining the position of the target object, one connection line can be generated according to the position of the target object and the position of the virtual camera. When the unmanned aerial vehicle performs operation on the target object, the orientation of the virtual camera can point along the connection line to the target object. When the unmanned aerial vehicle performs operation on the target object, the position of the unmanned aerial vehicle is located at a position where the distance from the position to the target object along the connection line is the operation distance.

In addition, the angle between the connection line of the position of the target object and the position of the unmanned aerial vehicle during operation of the unmanned aerial vehicle and the horizontal plane may be a pitch angle, and the angle between the projection of the connection line on the horizontal plane and the north direction is a yaw angle. After determining the orientation and position of the unmanned aerial vehicle, the pitch angle and the yaw angle may be finely adjusted to determine the position and orientation of the photographing effect. The interaction interface may include a preview window, and when the user adjusts the pitch angle and the yaw angle, the preview effect of the captured image may be displayed in the preview window when the unmanned aerial vehicle is located at the current position and orientation, so that the user can determine the adjustment policy of the pitch angle and the yaw angle according to the preview effect. After determining the position of one target object according to the click operation of the user on the interaction interface, if the user clicks on another target object, the position of the operation of the other target object is determined, then the two positions are connected through a connection line. The connection line is displayed on the interaction interface. In order to ensure the safety of the unmanned aerial vehicle in the operation process, the obstacle closest to the position of the unmanned aerial vehicle during operation can be determined. Whether the distance between the obstacle and the unmanned aerial vehicle during operation is less than a preset safe distance is determined. If the distance is smaller than the preset safe distance, the obstacle or the position is identified in the interaction interface, so that the user can adjust the position. Meanwhile, the obstacle closest to the connection line of the positions where the unmanned aerial vehicle performs operation on different target objects can also be determined. When a distance between the position of the obstacle and the connection line is less than a preset safe distance is determined, and if the distance is smaller than the preset safe distance, the obstacle and the connection line are identified, so that the user can adjust the position. After determining the position and orientation of the UAV when operating on each target object in the operation area, the position, pitch angle, yaw angle and operation distance of the target object can be stored, and then the UAV operation can be controlled according to the stored parameters. Of course, if the hardware parameters such as the focal length of the unmanned aerial vehicle and the pixel width of the sensor are changed, the operation distance can be re-determined according to the hardware parameters and the expected resolution of the unmanned aerial vehicle, and then the position and orientation of the unmanned aerial vehicle during operation of the unmanned aerial vehicle are re-determined according to the position of the target object, the pitch angle, the yaw angle and the operation distance. Since the position and orientation of the operation are determined by taking the target object as the center, the user only needs to set the operation path once at the interaction interface. Even if the hardware parameters of the unmanned aerial vehicle are changed, the position of the operation can be re-determined according to the stored position of the target object and the orientation of the unmanned aerial vehicle, and the parameter does not need to be reset by the user.

By using the method, the position and orientation of the unmanned aerial vehicle during operation of the unmanned aerial vehicle can be determined very conveniently by the user. The fine adjustment of the position during operation is based on the target object as the center, it is ensured that the target object is always at the center of the shooting image. Moreover, only the direction is changed without changing the operation distance during fine adjustment, which can ensure the operation effect. Furthermore, since the position of the target object is determined, the position of the operation can be conveniently changed according to the optimal operation distance of different unmanned aerial vehicles so as to adapt to different airplanes, and the same shooting effect may be achieved. A user does not need to re-determine the operation path for each operating unmanned aerial vehicle.

Figure 11:
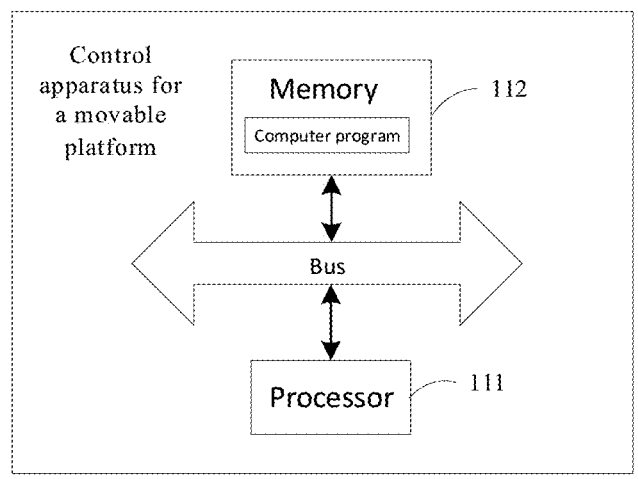
FIG. 11 is a schematic diagram of a movable platform control apparatus according to an embodiment of this disclosure.

In addition, one embodiment of the present disclosure further provides a control apparatus for a movable platform, as shown in FIG. 11. The apparatus includes a processor 111, a memory 112, a computer program executable by the processor 111 stored in the memory 112. The processor 111 may implement the following steps when executing the computer program:

obtaining a target object selection operation input by a user on an interaction interface, the interaction interface displaying a three-dimensional model of an operation area, the target object selection operation being used for determining a position of a target object in the operation area;

determining a target orientation of a movable platform when the target object is operated according to the orientation of the three-dimensional model displayed by the interaction interface when the target object selection operation is obtained; and determining a target position of the movable platform when the movable platform performs operation on the target object according to the position of the target object, the target orientation, and the operation distance of the movable platform, so that the movable platform moves to the target position and performs operation on the target object according to the target orientation.

In some embodiments, the orientation of the three-dimensional model displayed by the interaction interface corresponds to the orientation of a virtual camera.

In some embodiments, the target orientation is along a connection line between a position of the target object and a position of the virtual camera and points to the position of the target object.

In some embodiments, the target position is located on a connecting line of a position of the target object and a position of the virtual camera, and a distance between the target position and the target object is the operation distance.

In some embodiments, the processor is further configured to:

obtain an adjustment operation input by a user through the interaction interface;

determine an adjusted target position according to the position of the target object and the adjustment operation; and adjust the target orientation according to the adjusted target position, so that the target orientation is directed to a position of the target object by the adjusted target position.

In some embodiments, the adjusting operation includes a first adjustment operation, wherein the first adjustment operation enables the target position to be adjusted on a first target circle, a circle center of the first target circle is located at a position of the target object, a plane where the first target circle is located is perpendicular to a horizontal plane, and a radius of the first target circle is an operation distance of the movable platform.

In some embodiments, the adjusting operation includes a second adjustment operation that enables the target position to be adjusted on a second target circle, wherein a circle center of the second target circle is located at a projection position of the target object, the projection position is obtained by projecting a position of the target object onto a horizontal plane passing through the target position, and a radius of the second target circle is a distance from the projection position to the target position.

In some embodiments, the processor is further configured to:

display the first target circle and/or the second target circle in the interaction interface.

In some embodiments, the interaction interface includes a preview window, and after adjusting the target position and the target orientation based on the position of the target object and the adjustment operation, the method further includes:

displaying, in the preview window, the adjusted target position and performing an operation preview effect according to the adjusted target orientation.

In some embodiments, when the target position and the target orientation are adjusted, the position of the target object in the preview window is fixed.

In some embodiments, the interaction interface includes an adjustment control, and the adjustment operation is triggered based on the adjustment control.

In some embodiments, the processor is further configured to: when it is determined that the distance between the target position and the obstacle closest to the target position is less than a preset safe operation distance, identify the target position and/or the obstacle.

In some embodiments, the processor is further configured to: when the target object selection operation is a first target object selection operation, the method further includes:

obtaining a second target object selection operation input by a user on the interaction interface; and displaying, in the interaction interface, a connection line between a target position corresponding to the first target object selection operation and a target position corresponding to the second target object selection operation.

In some embodiments, the processor is further configured to: when it is determined that a distance between an obstacle and a connection line between a target position corresponding to the first target selection operation and a target position corresponding to the second target selection operation is less than a preset safe operation distance, identify the connection line and/or the obstacle.

In some embodiments, the processor is further configured to:

determine the operation distance according to the spatial resolution and/or the size of the target object;

wherein the spatial resolution refers to a physical size corresponding to a pixel point, and the spatial resolution is a spatial resolution input or preset by a user on an interaction interface.

In some embodiments, the processor is further configured to:

determine a target area corresponding to the target object according to the target object selection operation; and take the size of the target area as the size of the target object.

In some embodiments, the processor is further configured to store target parameters, wherein the target parameters are used to determine the target position and the target orientation.

In some embodiments, the target parameters include one or more of a position of the target object, the target orientation, the operation distance, a size of the target object, and a position of the virtual camera.

In some embodiments, the movable platform is a first movable platform, and the processor is further configured to:

obtain the stored target parameters, and determine the position and orientation of the second movable platform operation based on the hardware parameters of the second movable platform and the target parameters.

The control device of the movable platform may be equivalent to a control terminal or a part of the control terminal. Specific implementation details of determining the target position and the target orientation of the movable platform when performing the operation on the target object may refer to the description in various embodiments in the foregoing method, and details are not described herein again.

In addition, one embodiment of the present disclosure further provides a movable platform, wherein the movable platform is configured to receive a control instruction, and move to a target position based on the control instruction and perform operation on a target object in the operation area according to the target position.

The control instruction is determined by:

obtaining a target object selection operation input by a user on an interaction interface, the interaction interface displaying a three-dimensional model of an operation area, the target object selection operation being used for determining a position of a target object in the operation area;

determining a target orientation when the target object is operated according to the orientation of the three-dimensional model displayed by the interaction interface when the target object selection operation is obtained; and determining a target position of the movable platform when the movable platform performs operation on the target object according to the position of the target object, the target orientation, and the operation distance of the movable platform, so that the movable platform moves to the target position and performs operation on the target object according to the target orientation.

For specific implementation details of generating the control instruction, reference may be made to the description in various embodiments in the foregoing method, and details are not described herein again.

Further, one embodiment of the present disclosure provides a control system. The control system includes a movable platform and a control terminal, wherein the control terminal is configured to obtain a target object selection operation input by a user on an interaction interface, the interaction interface displaying a three-dimensional model of an operation area, and the target object selection operation being used for determining a position of a target object in the operation area;

determine a target orientation when the target object is operated according to the orientation of the three-dimensional model displayed by the interaction interface when the target object selection operation is obtained;

determine a target position of the movable platform when the movable platform performs operation on the target object according to the position of the target object, the target orientation, and the operation distance of the movable platform;

generate the control instruction based on the target orientation and the target position, and sending the control instruction to the movable platform; and moving the movable platform to the target position based on the control instruction and performing operation on the target object according to the target orientation.

The specific implementation details of the control terminal controlling the operation of the movable platform may refer to the description in various embodiments in the foregoing method, and details are not described herein again.

One embodiment of the present disclosure further provides a computer storage medium, wherein a program is stored in the storage medium, and when the program is executed by a processor, the method for controlling a movable platform in any of the above embodiments is implemented.

Embodiments of the present disclosure may take the form of a computer program product implemented on one or more storage media (including, but not limited to, a magnetic disk memory, a CD-ROM, an optical memory, etc.) containing program code. Computer-implementable storage media includes permanent and non-permanent, removable and non-removable media that can be stored by any method or technology. The information may be computer-readable instructions, data structures, modules of a program, or other data. Examples of storage media of a computer include, but are not limited to: static random access memory (SRAM), dynamic random access memory (DRAM), other types of random access memory (RAM), read-only memory (ROM), electrically erasable programmable read-only memory (EEPROM), flash memory or other memory technology, read-only disk read-only memory (CD-ROM), digital versatile disc (DVD), or other optical storage, magnetic cassettes, magnetic tape magnetic disk storage or other magnetic storage devices, or any other non-transmission medium, which can be used to store information that can be accessed by the computing device.

For the apparatus embodiment, since it basically corresponds to the method embodiment, reference may be made to a part of the method embodiment. The device embodiments described above are merely illustrative, and the units described as separate components may or may not be physically separate, and parts displayed as units may or may not be physical units, that is, may be located in one place, or may be distributed on multiple network units. Some or all of the modules may be selected according to actual needs to achieve the objectives of the solutions of the embodiments. Those of ordinary skill in the art may understand and implement the embodiments without creative efforts.

The above description is merely an embodiment of the present disclosure, and is not intended to limit the scope of the present disclosure. Any equivalent structure or equivalent process transformation made by using the description and the accompanying drawings of the present disclosure, or directly or indirectly applied to other related technical fields, is intended to be included in the patent protection scope of the present disclosure.

Finally, it should be noted that the above embodiments are only used to illustrate the technical solutions of the present disclosure and are not limiting thereof; while the present disclosure has been described in detail with reference to the foregoing embodiments, it will be understood by those of ordinary skill in the art that modifications may be made to the technical solutions set forth in the foregoing embodiments, or equivalents thereof may be substituted for some or all of the technical features thereof; however, such modifications or substitutions do not depart from the scope of the various embodiments of the present disclosure.

What is claimed is:

1. A method for controlling a movable platform, comprising: obtaining a target object selection operation input by a user on an interaction interface, the interaction interface displaying a three-dimensional model of an operation area, the target object selection operation configured to determine a position of a target object in the operation area; determining a target orientation of the movable platform when the target object is operated based on an orientation of the three-dimensional model displayed on the interaction interface when the target object selection operation is obtained; and determining a target position of the movable platform when the movable platform performs operation on the target object based on the position of the target object and the target orientation, so as to enable the movable platform to move to the target position and perform the operation on the target object according to the target orientation, wherein the method further comprises: obtaining an adjustment operation input by the user through the interaction interface; determining an adjusted target position according to the adjustment operation input; and adjusting the target orientation according to the adjusted target position to obtain an adjusted target orientation, so that the adjusted target orientation is directed from the adjusted target position to the position of the target object.

2. The method of claim 1, wherein the orientation of the three-dimensional model displayed on the interaction interface corresponds to an orientation of a virtual camera.

3. The method of claim 2, wherein the target orientation is along a connection line between the position of the target object and a position of the virtual camera and points to the position of the target object.

4. The method of claim 2, wherein the target position is located on a connection line between the position of the target object and a position of the virtual camera, and a distance from the target position to the target object is an operation distance.

5. The method of claim 1, wherein the adjustment operation comprises a first adjustment operation, and the first adjustment operation configured to adjust the target position on a first target circle, wherein a center of the first target circle is located at the position of the target object, a plane where the first target circle is located is perpendicular to a horizontal plane, and a radius of the first target circle is an operation distance of the movable platform.

6. The method of claim 5, wherein the adjusting operation further comprises a second adjustment operation, the second adjustment operation configured to adjust the target position on a second target circle,
wherein a center of the second target circle is located at a projection position of the target object, and the projection position is obtained by projecting a position of the target object onto a horizontal plane passing through the target position, and a radius of the second target circle is a distance from the projection position to the target position.

7. The method of claim 6, further comprising:
displaying the first target circle and/or the second target circle on the interaction interface.

8. The method of claim 1, wherein the interaction interface comprises a preview window, and after adjusting the target position and the target orientation based on the position of the target object and the adjustment operation, the method further comprises:
displaying an operation preview effect, in the preview window, of the movable platform at the adjusted target position performing an operation at the adjusted target orientation.

9. The method of claim 8, wherein during a process of adjusting the target position and the target orientation, the position of the target object in the preview window is fixed.

10. The method of claim 1, wherein the interaction interface comprises an adjustment control, and the adjustment control is configured to trigger the adjustment operation.

11. The method of claim 1, further comprising:
when determining that a distance between the target position and an obstacle closest to the target position is less than a preset safe operation distance, identifying the target position and/or the obstacle.

12. The method of claim 1, wherein the target object selection operation is a first target object selection operation, the method further comprising:
obtaining a second target object selection operation input by the user on the interaction interface; and
displaying, in the interaction interface, a connection line along the target position corresponding to the first target object selection operation and another target position corresponding to the second target object selection operation.

13. The method of claim 12, further comprising:
when determined that a distance between the connection line along the target position corresponding to the first target object selection operation and the another target position corresponding to the second target object selection operation and an obstacle closest to the connection line is less than a preset safe operation distance, identifying the connection line and/or the obstacle.

14. The method of claim 1, further comprising: determining an operation distance according to a spatial resolution and/or a size of the target object; wherein the spatial resolution refers to a physical size corresponding to a pixel point of an image, and the spatial resolution is input or preset by the user on the interaction interface.

15. The method of claim 14, further comprising:
determining a target area corresponding to the target object according to the target object selection operation; and
taking a size of the target area as the size of the target object.

16. The method of claim 1, further comprising:
storing target parameters, wherein the target parameters are used to determine the target position and the target orientation.

17. The method of claim 16, wherein the movable platform is a first movable platform, and the method further comprising:
obtaining the stored target parameters and determining target position and target orientation of the second movable platform performing the operation on the target object based on hardware parameters of the second movable platform and the target parameters.

18. The method of claim 1, wherein the determining the target position of the movable platform when the movable platform performs operation on the target object is based on the position of the target object, the target orientation, and an operation distance of the movable platform.

19. The method of claim 1, wherein the determining the adjusted target position according to the adjustment operation comprises:
determining the adjusted target position according to the position of the target object and the adjustment operation.

20. A control apparatus for a movable platform, comprising a processor configured to: obtain a target object selection operation input by a user on an interaction interface, the interaction interface displaying a three-dimensional model of an operation area, the target object selection operation configured to determine a position of a target object in the operation area; determine a target orientation of the movable platform when the target object is operated based on an orientation of the three-dimensional model displayed on the interaction interface when the target object selection operation is obtained; and determine a target position of the movable platform when the movable platform performs operation on the target object based on the position of the target object and the target orientation, so as to enable the movable platform to move to the target position and perform the operation on the target object according to the target orientation, wherein the processor is further configured to: obtain an adjustment operation input by the user through the interaction interface; determine an adjusted target position according to the adjustment operation input; and adjust the target orientation according to the adjusted target position to obtain an adjusted target orientation, so that the adjusted target orientation is directed from the adjusted target position to the position of the target object.

* * * * *